United States Patent
Falger et al.

(10) Patent No.: US 11,340,106 B2
(45) Date of Patent: May 24, 2022

(54) FILL-LEVEL MEASURING DEVICE

(71) Applicant: Endress+Hauser SE+Co. KG, Maulburg (DE)

(72) Inventors: Florian Falger, Häg-Ehrsberg (DE); Florian Palatini, Kleines Wiesental (DE); Peter Klöfer, Steinen (DE); Jan Schleiferböck, Rümmingen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 145 days.

(21) Appl. No.: 16/944,921

(22) PCT Filed: Jan. 14, 2019

(86) PCT No.: PCT/EP2019/050804
§ 371 (c)(1),
(2) Date: Jul. 31, 2020

(87) PCT Pub. No.: WO2019/149512
PCT Pub. Date: Aug. 8, 2019

(65) Prior Publication Data
US 2020/0355537 A1    Nov. 12, 2020

(30) Foreign Application Priority Data
Feb. 2, 2018 (DE) .................... 10 2018 102 366.9

(51) Int. Cl.
*G01F 23/284* (2006.01)
*G01B 15/08* (2006.01)
(Continued)

(52) U.S. Cl.
CPC .......... *G01F 23/284* (2013.01); *G01B 15/08* (2013.01); *G01S 13/867* (2013.01); *G01S 13/89* (2013.01)

(58) Field of Classification Search
CPC ..... G01S 13/865; G01S 13/867; G01F 23/284
See application file for complete search history.

(56) References Cited

U.S. PATENT DOCUMENTS 6,047,598 A * 4/2000 Otto .................. G01F 25/24
367/908
8,159,660 B2 * 4/2012 Mimeault ............ G01F 23/292
356/5.1
(Continued)

FOREIGN PATENT DOCUMENTS

CN     101087996 A    12/2007
CN     102607669 A    7/2012
(Continued)

*Primary Examiner* — Peter M Bythrow
(74) *Attorney, Agent, or Firm* — Mark A. Logan; Endress+Hauser (USA) Holding Inc.

(57) ABSTRACT

Disclosed is a fill-level measuring device for determining the fill level in a container. The device comprises: a radar module for determining a distance to the surface of the filling material; a 3D camera for capturing at least one region of the surface of the filling material; and an evaluation circuit that is designed to measure a maximum distance and a minimum distance from the captured distance values and to determine the fill level on the basis of the distance, providing that the distance is smaller than the maximum distance value and greater than the minimum distance value. As a result of the redundancy or the verification provided by the 3D camera of the distance calculated by the radar module, the fill-level measuring device according to the invention is therefore more reliable with regard to the miscalculation of an incorrect fill level.

13 Claims, 2 Drawing Sheets

(51) Int. Cl.
    *G01S 13/86*    (2006.01)
    *G01S 13/89*    (2006.01)

(56) References Cited

U.S. PATENT DOCUMENTS

| | | | | |
|---|---|---|---|---|
| 9,502,811 | B1* | 11/2016 | Halliburton | H01R 13/502 |
| 2004/0031335 | A1 | 2/2004 | Fromme et al. | |
| 2008/0155064 | A1 | 6/2008 | Kosuge et al. | |
| 2008/0302439 | A1* | 12/2008 | Spanke | G01F 25/20 |
| | | | | 141/95 |
| 2011/0272866 | A1* | 11/2011 | Shameli | B22D 2/003 |
| | | | | 266/78 |
| 2012/0158363 | A1* | 6/2012 | Hammer | G01D 3/10 |
| | | | | 702/183 |
| 2012/0230371 | A1* | 9/2012 | Chiskis | G01S 15/102 |
| | | | | 375/E1.018 |
| 2012/0281096 | A1* | 11/2012 | Gellaboina | G01S 15/88 |
| | | | | 342/179 |
| 2013/0132005 | A1* | 5/2013 | Welle | G01F 23/00 |
| | | | | 702/55 |
| 2015/0010444 | A1* | 1/2015 | Mairesse | G01F 23/292 |
| | | | | 29/890 |
| 2015/0048963 | A1* | 2/2015 | Dieterle | G01F 23/296 |
| | | | | 342/5 |
| 2015/0248576 | A1 | 9/2015 | Miecznik et al. | |
| 2016/0265959 | A1* | 9/2016 | Blodt | G01F 23/26 |
| 2017/0087526 | A1* | 3/2017 | Luharuka | G01F 23/296 |
| 2017/0276534 | A1* | 9/2017 | Vermue | A01D 90/02 |
| 2018/0094965 | A1* | 4/2018 | Altendorf | G01F 23/292 |
| 2019/0056258 | A1* | 2/2019 | Gelada Camps | G01F 23/2928 |
| 2020/0011724 | A1* | 1/2020 | Dieterle | G01B 11/24 |

FOREIGN PATENT DOCUMENTS

| | | |
|---|---|---|
| CN | 103189720 A | 7/2013 |
| CN | 106323418 A | 1/2017 |
| CN | 106949944 A | 7/2017 |
| DE | 2709548 A1 | 9/1977 |
| DE | 4339441 A1 | 5/1995 |
| DE | 19860901 A1 | 7/2000 |
| DE | 102005063079 A1 | 7/2007 |
| DE | 102016111570 A1 | 12/2017 |
| WO | 0160718 A2 | 8/2001 |
| WO | 2016187376 A1 | 11/2016 |

* cited by examiner

FILL-LEVEL MEASURING DEVICE

CROSS-REFERENCE TO RELATED APPLICATIONS

The present application is related to and claims the priority benefit of German Patent Application No. 10 2018 102 366.9, filed on Feb. 2, 2018 and International Patent Application No. PCT/EP2019/050804, filed on Jan. 14, 2019, the entire contents of which are incorporated herein by reference.

TECHNICAL FIELD

The invention relates to a radar-based fill-level measuring device.

BACKGROUND

Field devices serving to capture and/or modify process variables are frequently used in process automation technology. In order to detect process variables, sensors are used, which are, for example, used in fill-level measuring devices, flow-rate measuring devices, pressure- and temperature-measuring devices, pH redox potential measuring devices, conductivity-measuring devices, etc. They detect the corresponding process variables, such as the fill level, flow rate, pressure, temperature, pH value, redox potential, or conductivity. A variety of such field devices is manufactured and marketed by the Endress+Hauser company.

For measuring the fill level of filling materials in containers, contactless measuring methods have become established, because they are robust and require minimum maintenance. Within the scope of the invention, the term "container" also refers to containers that are not closed, such as basins, lakes, or flowing bodies of water. A further advantage of contactless measuring methods consists in the ability to be able to measure the fill level quasi-continuously. Radar-based measuring methods are therefore predominantly used in the field of continuous fill-level measurement (in the context of this patent application, "radar" is defined as signals or electromagnetic waves with frequencies between 0.03 GHz and 300 GHz). The two common measurement principles here are the pulse propagation principle (also known under the term "pulse radar") and the FMCW principle ("frequency-modulated continuous wave").

A fill-level measuring device which operates by the pulse propagation method is described, for example, in unexamined patent application DE 10 2012, 104, 858 A1. For a typical construction of FMCW-based fill-level measuring devices, reference is made by way of example to the unexamined patent application DE 10 2013 108 490 A1.

Radar-based fill-level measurement is highly accurate and insensitive to rough or wrinkled filling material surfaces. However, depending on the type of filling material and the nature of the interior of the container, it is not always possible to verify the fill-level value determined by radar, since, for example, in some cases an unwanted echo is incorrectly used for fill-level calculation instead of the echo of the fill material surface. This can result in an incorrect determination of the fill level, as a result of which a corresponding hazard state can under certain circumstances occur in the process plant.

The aim of the invention is therefore to provide a safer fill-level measuring device.

The invention achieves this aim by means of a fill-level measuring device for determining the fill level of a filling material located in a container, comprising
- a radar module designed to emit a radar signal in the direction of the filling material and to determine a distance from the surface of the filling material on the basis of the reflected radar signal,
- a 3D camera designed to determine a plurality of distance values as a function of corresponding positions within the region on the basis of a recording of at least one region of the surface of the filling material, and
- an evaluation circuit configured to:
    - calculate from the distance values a maximum distance value and a minimum distance value, and
    - determine the fill level on the basis of the distance provided the distance is less than the maximum distance value and is greater than the minimum distance value.

SUMMARY

Within the framework of this application, the term "3D camera" includes any system by means of which the respective distance values for the nearest object can be recorded as a corresponding pixel value in a selected image region. Thus, for example, so-called TOF cameras ("time of flight") can be used for this purpose, which comprise corresponding semiconductor-based sensors (also known as PMD sensors, "photonic mixing device"). However, the same functionality can also be effected, for example, by means of a so-called light-field camera or at least two interconnected conventional digital cameras.

Due to the redundancy or the verification of the measured value determined by the radar module by means of the 3D camera, the inventive fill-level measuring device becomes safer with regard to the determination of the correct fill level. Nevertheless, high measurement accuracy is still ensured by the radar module. The measurement accuracy of the radar module increases with increasing frequency of the radar signal. It is therefore advantageous if the radar module is designed to emit the radar signal at a frequency of at least 75 GHz (irrespective of whether the radar module determines the distance to the surface of the filling material by the FMCW method or by the pulse propagation method). It goes without saying that the invention can also be implemented at lower frequencies, for example 26 GHz.

In the case of an error, that is to say if the distance determined by the radar module is less than the minimum distance value or is greater than the maximum distance value, the evaluation circuit can be designed, for example, in such a way that it outputs a first warning signal in this case. This could be transmitted to a control center via a corresponding interface of the field device, so that this can possibly be reacted to in the process plant or a check be made of the fill-level measuring device by a service technician.

The evaluation circuit can also be designed to output the first warning signal and/or a further warning signal if the minimum distance value is less than a corresponding value for a predefined maximum fill level. This corresponds to the at least punctiform exceeding of the fill level beyond an allowed maximum fill level. It is advantageous here that the punctiform exceeding of the maximum filling level (for example due to a bulk material cone during filling) is already detected, even when the radar module has not yet detected this.

In a further design variant of the fill-level measuring device, the evaluation circuit can be designed to
calculate a difference value by subtracting the minimum distance value from the maximum distance value, and
output the first warning signal and/or a further warning signal if the difference value exceeds a predefined maximum range.

In this case, a warning signal is output as soon as the filling material surface becomes too inhomogeneous or the filling material is distributed too inhomogeneously in the container. This can occur, for example, if residues adhere to the inner wall of the container when the container is being emptied, or if a single bulk material cone is too pronounced during filling. Thus, when the signal appears, cleaning of the container could be initiated, or redistribution of the filling material, for example by means of a stirring mechanism. Furthermore, for example, on the basis of the determined difference value, a gradient or inclination of the filling material surface between the locations of the two distance values corresponding thereto could be calculated. Such information can be used in order, for example, to be able to determine the taper or the angle of a possible bulk material cone.

On the basis of the recording of the 3D camera, in addition to the validation of the fill level, other properties of the filling material can also be determined depending on the design. If the evaluation circuit is designed, for example, to determine a scatter from the distance values of a selected section of the region of the recording, it would be conceivable for the evaluation circuit to determine a roughness of the surface of the filling material from the determined scatter. If the type of filling material is known, it is possible, for example, to derive a grain size or a comparable variable therefrom.

As an alternative or in addition to the scatter, a (standard) deviation from the mean value or the median of the distance values recorded by the 3D camera may optionally also be determined. Thus, in addition to or alternatively to determining the fill level on the basis of the distance measured by the radar module, which is verified on the basis of the maximum and minimum distance values, it would also be possible to verify the distance measured by the radar module on the basis of the median or mean value: If the distance to the filling material surface measured by the radar module falls below the predefined (standard) deviation from the median or mean value of the distance values recorded by the 3D camera, the fill level will be determined on the basis of the distance.

Depending on the type of 3D camera, this can be designed to additionally generate a grayscale image of the surface of the filling material in the region in which the 3D camera determines the distance values. By way of example, this can advantageously be used within the scope of the invention in order to simultaneously record a grayscale image when a warning signal is output. In the event of an error, a plant operator or service technician is thus enabled to search for a potential cause of error within the container. In a grayscale image, the cone of the radar signal could be visualized, for example as a target circle or cross. The current orientation of the fill-level measuring device can be tracked herewith, or this could assist in the orientation of the fill-level measuring device during assembly, for example in order to "steer the radar signal past" any interfering bodies.

A further advantageous further development of the fill-level measuring device provides for designing the evaluation circuit in such a way that it detects a contour on the basis of the recording within the region if along the contour a discontinuity is detected between the distance values on the two sides of the contour. This would be useful for determining an internal cross-section, in particular an inner cross-sectional area, of the container on the basis of the detected contour. In addition, however, it could also be the contours of other objects, such as, for example, stirrers. In particular, movable objects such as stirrers can be located as such when the evaluation circuit is designed to detect a movement and/or a displacement of the contour.

With the aid of the 3D camera, it is also conceivable to design the evaluation circuit in order to determine the orientation of the fill-level measuring device relative to the vertical. This is possible if an approximately flat plane, such as the surface of a liquid filling material, can be determined on the basis of the recording within the region. The normal vector of the plane can thus be determined. Since the resulting plane is in the horizontal in the case of liquid filling materials, the normal vector determined corresponds to the vertical. This in turn makes it possible to determine the orientation of the fill-level measuring device relative to the vertical. This can advantageously be used in the installation of the fill-level measuring device, since an exactly vertical alignment of the radar module is advantageous for its safe operation. The current alignment or deviation from the vertical could be visually indicated during installation of the fill-level measuring device on a display of the fill-level measuring device or that of a peripheral device.

Analogously to the fill-level measuring device according to the invention, the object on which the invention is based is solved by a method for determining the fill level of a filling material located in a container by means of the fill-level measuring device according to one of the aforementioned embodiments. The method comprises the following method steps:
determining a distance to the surface of the filling material on the basis of a reflected radar signal emitted by a radar module in the direction of the filling material,
determining a plurality of distance values on the basis of a recording of a 3D camera of at least one region of the surface of the filling material,
determining a maximum distance value and a minimum distance value from the distance values by means of an evaluation circuit,
determining the fill level on the basis of the distance by the evaluation unit if the distance is less than the maximum distance value and is greater than the minimum distance value.

BRIEF DESCRIPTION OF THE DRAWINGS

The invention will be explained in more detail with reference to the following figures. The following is shown.

DETAILED DESCRIPTION

Figure 1:
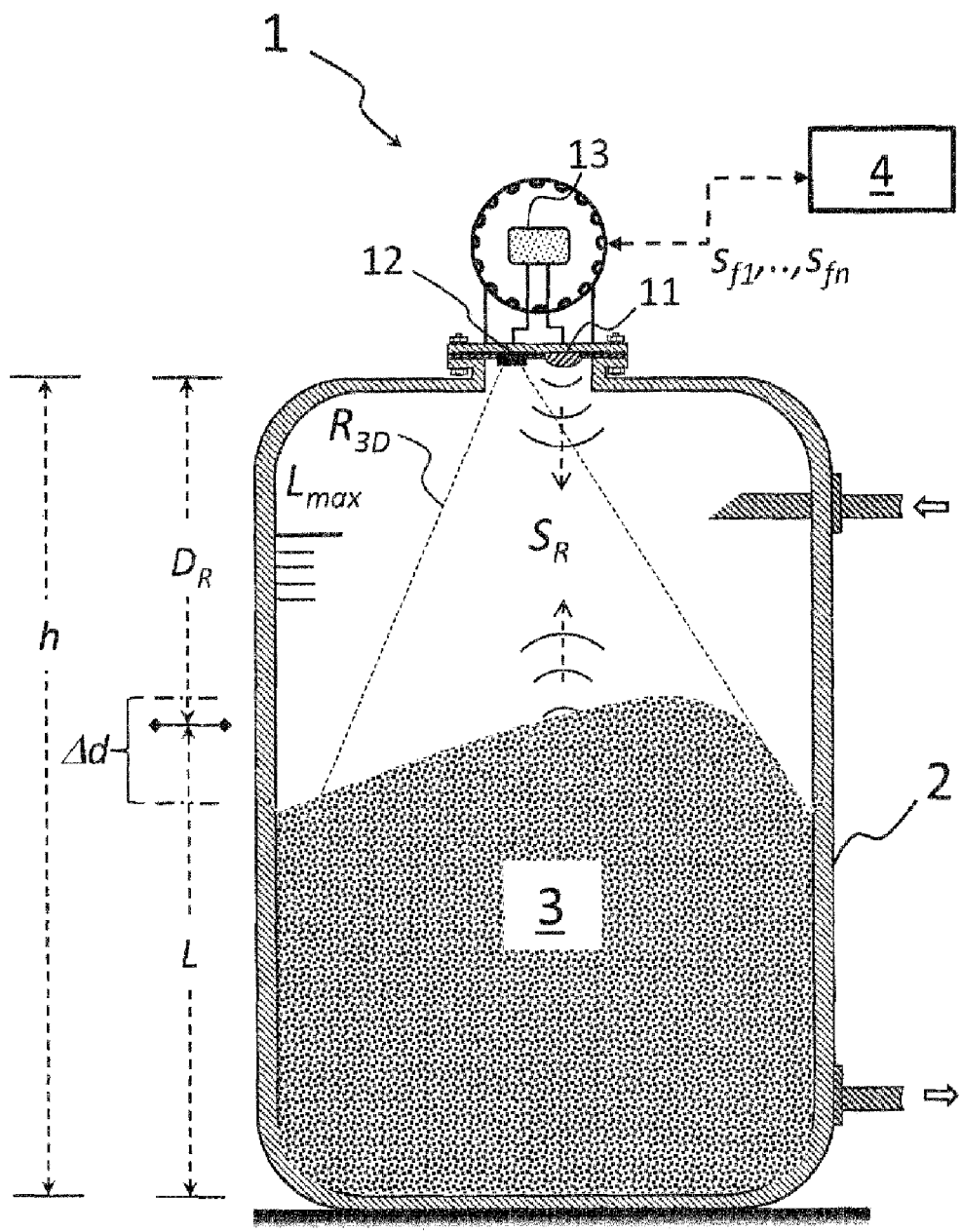
FIG. 1 shows a schematic representation of a fill-level measuring device according to the present disclosure on a container with a filling material.

For understanding the invention, FIG. 1 shows an arrangement of the fill-level measuring device 1 according to the invention on a flanged connection of a container 2, as is generally customary for radar-based fill-level measuring devices. In the container 2 there is a filling material 3, whose level L is to be determined by the fill-level measuring device 1. For this purpose, the fill-level measuring device 1 is mounted on the container 2 at a known installation height h above the filling material 3. In this case, the container 2 can be more than 100 m high, depending on the type.

The fill-level measuring device 1 is aligned and fastened to the container 2 in such a way that it continuously, cyclically or also acyclically emits a radar signal $S_R$ in the direction of the surface of the filling material 3, doing so by means of a radar module 11. As a result of the reflection of the radar signal $S_R$ at the filling material surface, the radar module 11 of the fill-level measuring device 1 receives the reflected radar signal $S_R$ as a function of the distance $D_R$=h–L to the filling material surface after a corresponding running time.

As a rule, the fill-level measuring device 1 is connected via an interface, such as "PROFIBUS", "HART" or "Wireless HART", to a higher-level unit 4, such as a process control system. In this way, the fill-level value L can be transmitted, for example in order to control the flow or discharge of the container 2 if necessary. However, other information about the general operating state of the fill-level measuring device 1 can also be communicated.

If the radar module 11 operates by the pulse radar method, the radar signal $S_R$ will be radar pulses possibly periodically emitted, so that the distance $D_R$ and thus the fill level L can be determined directly on the basis of the pulse propagation time between emission of the pulse and the reflected pulse-shaped radar signal $S_R$.

In the case of FMCW radar, the radar signal $S_R$ is a continuous signal, but with a temporally defined modulated frequency. Accordingly, the propagation time and thus the distance $D_R$ or the fill level L when implementing the FMCW method can be determined on the basis of the instantaneous frequency difference between the currently received radar signal $S_R$ and the radar signal $S_R$ emitted at the same time. With both radar methods, it is possible according to the prior art to resolve the fill level L already with an accuracy in the sub-micron range under ideal conditions (well-reflecting filling material 3, flat filling material surface, no obstacles such as stirrers or other internals in the signal path of the radar signal $S_R$). Even in the case of rough or wrinkled filling material surfaces or a dusty atmosphere, a reliable measurement of the fill level L at a point on the filling material surface is possible by means of the radar methods described above.

However, periodic measurement of the fill level L by means of the radar methods described above comes up against its limits when the surface of the filling material 3 is not flat. This can occur in particular in the case of bulk material 3 of filling material, for example when bulk cones form during filling of the container 2. When the filling material 3 is being pumped out, depressions can occur on the filling material surface. Since the fill level is determined by means of the radar module 11 only periodically at a point on the surface of the filling material 3, this can lead to an erroneous interpretation of the fill level L. For example, an emptying operation can be stopped when an empty container 2 has been detected by the radar module 11 even though filling material 3 is still present at the edge of the container interior. In the opposite case, when the container 2 is full, it may happen that a filling operation is not stopped even though a maximum filling level $L_{max}$ at one location on the filling material surface has already been exceeded, because this was not detected by the radar module 11.

According to the invention, the fill-level measuring device 1 shown in FIG. 1 therefore comprises a 3D camera 12 in addition to the radar module 11 for emitting and receiving the radar signal $S_R$. Analogously to the radar module 11, the 3D camera 12 is arranged and oriented in such a way that a recording $R_{3D}$ can be recorded by means of the 3D camera 12 of the surface of the filling material 3 or at least of an area of the surface. In this case, as can be seen from the top view of the filling material surface in FIG. 2, the recording $R_{3D}$ is composed of a multiplicity of distance values $d_{i,j}$ as a function of corresponding pixels or positions [i, j] which are present within the recorded region [m; n].

Figure 3:
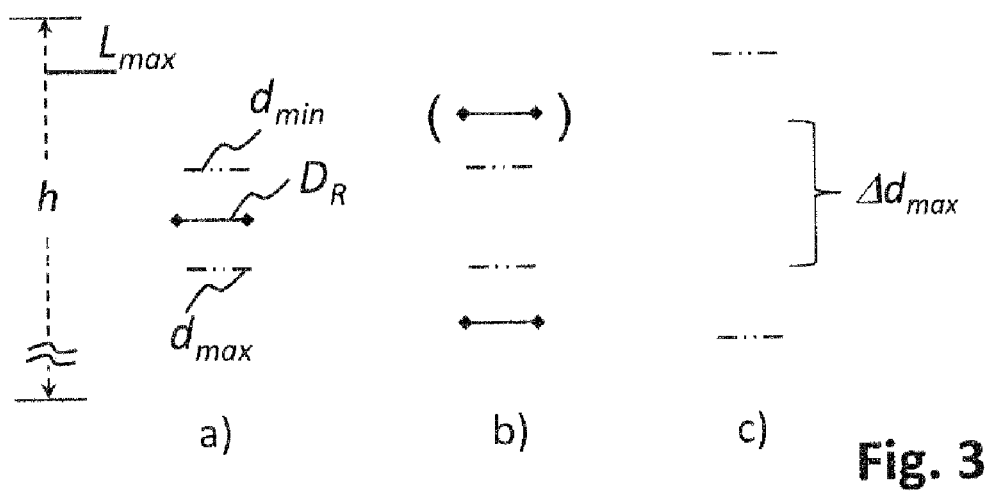
FIG. 3 shows different measured values depending on different measurement conditions.

In principle, the additional determination of the distance values by the 3D camera increases the redundancy of the fill-level measuring device 1: The distance values can be compared to the distance $D_R$ determined by the radar module 11. For this purpose, the maximum distance value $d_{max}$ and the minimum distance value $d_{min}$ can be determined from the distance values of the 3D camera. If the distance $D_R$ is less than the maximum distance value of $d_{max}$ and greater than the minimum distance value of $d_{min}$ (shown in section (a) of FIG. 3), this can be interpreted as verification of the distance $D_R$ determined by the radar module. If the verification is unsuccessful, i.e. the distance $D_R$ determined by the radar module 11 is less than the minimum distance value of $d_{min}$ or greater than the maximum distance value of $d_{max}$ (shown in section (b) in FIG. 3), the fill-level measuring device 1 may for example output a first warning signal $s_{f1}$ to the higher-level unit 4. The reason for this may be, for example, that the radar module is not receiving the radar signal $S_R$, which is produced as echo from the filling material surface, but rather an unwanted echo such as, for example, a multiple reflection.

This type of verification can be applied both to flat and non-flat filling material surfaces. In general, the ability to verify the ascertained fill level L represents an advantageous property of the fill-level measuring device 1 since it is potentially possible to meet one of the required specifications with regard to functional safety, for example, the IEC 61508 standard. In many applications, compliance with corresponding standards is in turn a precondition for permitting the fill-level measuring device 1 to be used for the corresponding application.

In the fill-level measuring device 1 shown in FIG. 1, an evaluation circuit 13 is provided for verification of the distance $D_R$ and compares the distance values with the distance $D_R$ determined by the radar module 11 for this purpose. In this case, the evaluation circuit 13 can be realized, for example, as a microcontroller, in which the distance values and the distance $D_R$ can be retrieved from the radar module 11 or the 3D camera via corresponding inputs. On the output side, the evaluation circuit 13 can be connected to the higher-level unit 4 in order to transmit the corresponding first warning signal $s_{f1}$, for example in the case of unsuccessful verification.

Figure 2:
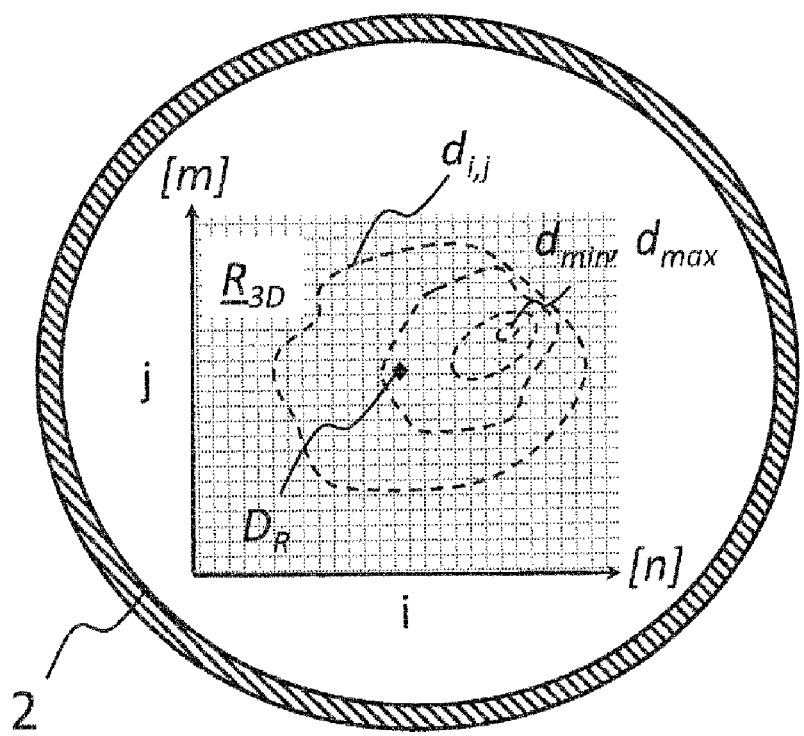
FIG. 2 shows a top view of the filling material from the perspective of the fill-level measuring device according to the present disclosure.

In the recording $R_{3D}$ of the filling material surface shown in FIG. 2, a situation is shown in which the filling material surface is not flat, but has a bulk material cone (see also FIG. 1). The bulk material cone or the profile of the filling material surface is shown in the form of contour lines. Accordingly, the minimum distance $d_{min}$ detected by the 3D camera is located at the tip of the bulk material cone. In an alternative interpretation of FIG. 2, the contour lines of the filling material surface can also represent a depression funnel, so that the maximum distance $d_{max}$ ascertained by the 3D camera 12 represents the deepest point of the depression.

Even in the case of a flat surface, for example in the case of liquid filling materials 2, advantageous synergy effects are possibly produced by the additional 3D camera 12: For example, the evaluation circuit 13 can be designed to determine the orientation of the fill-level measuring device 1 relative to the vertical. This can be calculated, for example, by mathematically defining a plane and determining its normal vector within the region of [m; n] of the recording $R_{3D}$ on the basis of the distance values $d_{i,j}$. Since the resulting plane is horizontal for liquid fill materials 3, the normal vector corresponds to the vertical. Since an exactly vertical alignment of the radar module 11 is advantageous on account of the optimum reception of the reflected radar signal $S_R$, the determination of the orientation relative to the vertical is appropriate above all during installation of the fill-level measuring device 1. For example, the current orientation of the vertical could be displayed during installation of the fill-level measuring device 1 on its display or on a display of a peripheral device.

In addition to the pure verification of the determined distance $D_R$, the recording $R_{3D}$ of the distance values $d_{i,j}$ offers further synergy effects: Further irregular states in the container 2 can be detected by further analysis of the distance values $d_{i,j}$: with the aid of the difference value $\Delta d$ between the maximum distance value of $d_{max}$ and the minimum distance value of drain and/or the absolute position of minimal distance value of $d_{min}$ and maximum distance value $d_{max}$ (with respect to the container height h) it can thus be concluded for example that there is a possible bulk material cone, a depression funnel or deposits of the filling material 3 on the wall of the container 2. In this case, a corresponding warning signal $s_{f1}, \ldots, s_{fn}$ can be generated, in particular when the difference value $\Delta d$ over a predefined maximum range $\Delta d_{max}$ (shown schematically in FIG. 3, section (c)) is exceeded. Furthermore, a gradient or inclination of the filling material surface between the locations of the two distance values $d_{i,j}$ corresponding to this could be calculated, for example on the basis of the difference value $\Delta d$, in order for example to be able to determine the taper of any bulk material cone.

If the 3D camera is designed for this purpose, at least in those situations in which a warning signal $s_{fn}$ is output, it can additionally record a grayscale image of the region [m; n] of the filling material surface that can be provided for examining the particular situation (on the display of the fill-level measuring device 1 or for example also on a display of an external mobile radio device). FIG. 2 does not show that the recording $R_{3D}$ in FIG. 2 also encompasses the inner cross-section of the container 2. In such a case, the evaluation circuit 13 could be designed, for example, to determine the internal cross-section on the basis of the recording $R_{3D}$. In this case, the internal cross-section as such can be detected in that the evaluation circuit within the recording $R_{3D}$ searches for a corresponding contour within the recording $R_{3D}$. In this case, a "contour" is defined in that a predefined discontinuity, that is to say a "kink" or a jump, of the corresponding distance values $d_{i,j}$ between the two sides of the contour can be determined along the contour.

In this connection, a jump between two distance values possibly separated by a contour, can be mathematically detected in the simplest case by the difference value of these distance values exceeding a predefined value. By contrast, the determination of a "kink" between two distance values between which the contour runs is less trivial: For this purpose, the distance values which in each case lie further outwardly in relation to the contour can also be included in such a way that the change or the "gradient" between them is to be calculated. In this case, an abrupt change in the slope between two distance values refers to the course of a contour between them. Corresponding analytical or numerical methods, which can be implemented in the evaluation circuit 13 for this purpose, are sufficiently known.

If the internal cross-section of the container 2 is determined in this way, on the basis of this the internal cross-sectional area of the container 2 can be deduced. This in turn can be used to calculate the volume which the filling material 3 actually occupies in the container 2 on the basis of the determined distance values $d_{i,j}$ (or on the basis of the distance $D_R$ determined by the radar module 11 if the filling material 3 has a flat surface). This offers the advantage that, in the calculation of the volume, any change in the internal cross-section of the container 2 can also be taken into account with the height h. It goes without saying that this type of volume calculation can be applied not solely in the case of circular internal cross-sections, as shown in FIG. 2.

When a contour is detected by the evaluation circuit 13, the contour can be assigned not solely to the inner cross-section of the container 2. If perturbations such as stirrers or inlets/outlets are present in the container 2 within the recording $R_{3D}$, these can also appear as contours in the recording $R_{3D}$. In the case of rotating agitators, a moving contour could be assigned correspondingly. In this way, for example, a distance value $D_R$ measured by radar module 11, which corresponds to distance values $d_{i,j}$ enclosed by the contour, can be classified as erroneous.

If the evaluation circuit 13 can carry out a contour recognition, there is a further possible application in addition to the detection of disturbances and the determination of the container internal cross-section: When the fill-level measuring device 1 is attached to a round connection, such as for example a flange (see FIG. 1) a possibly detected contour can also be assigned to the flange opening. Those distance values $d_{i,j}$ which are assigned to the contour can serve to determine the distance $D_R$ by the radar module 11: The radar signal $S_R$ received after reflection, which has a time- and thus a distance-dependence both in the case of pulse radar and FMCW methods, can thus only be evaluated below the distance values $d_{i,j}$ corresponding to the flange in order to block out interfering components of the received radar signal $S_R$ from this region.

The invention claimed is:

1. A system for determining a fill level of a filling material located in a container, the system comprising:
    a radar module which is designed to emit a radar signal in the direction of the filling material and to determine a distance from a surface of the filling material on the basis of a reflected radar signal;
    a 3D camera which is designed to determine a plurality of distance values on the basis of a recording of at least one region of the surface of the filling material as a function of corresponding positions within the region; and
    an evaluation circuit configured to:
        determine a maximum distance value and a minimum distance value from the plurality of distance values; and
        determine the fill level using the distance when the distance is less than the maximum distance value and greater than the minimum distance value.

2. The fill-level measuring device according to claim 1, wherein the evaluation circuit is further configured to output a first warning signal when the distance determined by the radar module is less than the minimum distance value or greater than the maximum distance value.

3. The fill-level measuring device according to claim 2, wherein the evaluation circuit is further configured to output the first warning signal and/or a further warning signal when the minimum distance value is less than a corresponding value at a predefined maximum level.

4. The fill-level measuring device according to claim 2, wherein the evaluation circuit is further configured to:
calculate a difference value by subtracting the minimum distance value from the maximum distance value; and
output the first warning signal and/or a further warning signal when the difference value exceeds a predefined maximum range.

5. The fill-level measuring device according to claim 1, wherein the evaluation circuit is designed to determine a scatter from the plurality of distance values of a selected section of the region of the recording, and wherein the evaluation circuit is configured to determine a roughness of the surface of the filling material from the determined scatter.

6. The fill-level measuring device according to claim 1, wherein the radar module is designed to emit the radar signal at a frequency of at least 75 GHz.

7. The fill-level measuring device according to claim 1, wherein the radar module is designed to determine the distance from the surface of the filling material by the FMCW method or by the pulse propagation method.

8. The fill-level measuring device according to claim 1, wherein the 3D camera is designed to generate a grayscale image of the surface of the filling material in the region in which the 3D camera determines the plurality of distance values.

9. The fill-level measuring device according to claim 1, wherein the evaluation circuit is designed to detect a contour on the basis of the recording within the region if along the contour a discontinuity is detected between the distance values on the two sides of the contour.

10. The fill-level measuring device according to claim 9, wherein the evaluation circuit is designed to detect a movement and/or a displacement of the contour.

11. The fill-level measuring device according to claim 9, wherein the evaluation circuit is designed to determine an internal cross-section, including an internal cross-sectional area, of the container on the basis of the detected contour.

12. The fill-level measuring device according to claim 1, wherein the evaluation circuit is designed to determine an orientation of the fill-level measuring device with respect to a vertical, when a flat plane is determined on the basis of the recording within the region.

13. A method for determining a fill level of a filling material located in a container, the method comprising:
providing a system for determining the fill level of the filling material located in the container, the system including:
a radar module which is designed to emit a radar signal in the direction of the filling material and to determine a distance from a surface of the filling material on the basis of a reflected radar signal;
a 3D camera which is designed to determine a plurality of distance values on the basis of a recording of at least one region of the surface of the filling material as a function of corresponding positions within the region; and
an evaluation circuit configured to:
determine a maximum distance value and a minimum distance value from the plurality of distance values; and
determine the fill level using the distance when the distance is less than the maximum distance value and greater than the minimum distance value;
determining a distance to the surface of the filling material on the basis of a reflected radar signal emitted by the radar module in the direction of the filling material;
ascertaining a plurality of distance values on the basis of a recording of a 3D camera of at least one region of the surface of the filling material;
determining a maximum distance value and a minimum distance value from the plurality of distance values by means of an evaluation circuit; and
determining the fill level by means of the distance by the evaluation unit when the distance is less than the maximum distance value and greater than the minimum distance value.

* * * * *